US011253906B2

(12) United States Patent
Haag et al.

(10) Patent No.: US 11,253,906 B2
(45) Date of Patent: Feb. 22, 2022

(54) METHOD FOR PRODUCING A BEARING COMPONENT, AND BEARING COMPONENT

(71) Applicant: Schaeffler Technologies AG & Co. KG, Herzogenaurach (DE)

(72) Inventors: Bertram Haag, Uehlfeld (DE); Peter Geschwindner, Erlangen (DE); Toni Blaß, Bergrheinfeld (DE); Daniel Merk, Thüngersheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/646,231

(22) PCT Filed: Sep. 13, 2018

(86) PCT No.: PCT/DE2018/100781
§ 371 (c)(1),
(2) Date: Mar. 11, 2020

(87) PCT Pub. No.: WO2019/057242
PCT Pub. Date: Mar. 28, 2019

(65) Prior Publication Data
US 2020/0269307 A1    Aug. 27, 2020

(30) Foreign Application Priority Data

Sep. 19, 2017   (DE) .................... 10 2017 121 629.4

(51) Int. Cl.
*F16C 33/30* (2006.01)
*B21D 53/10* (2006.01)
(52) U.S. Cl.
CPC .................................. *B21D 53/10* (2013.01)

(58) Field of Classification Search
CPC .......... B21D 53/10; F16C 19/06; F16C 33/64; F16C 2240/60; F16C 2204/60;
(Continued)

(56) References Cited

U.S. PATENT DOCUMENTS

| 3,319,314 A | 5/1967 | Caubet |
| 4,947,668 A * | 8/1990 | Ostertag ................. B24B 39/04 72/75 |

(Continued)

FOREIGN PATENT DOCUMENTS

| CN | 1966767 A | 5/2007 |
| CN | 103668227 A | 3/2014 |

(Continued)

OTHER PUBLICATIONS

English translation of DE102010031439 (Year: 2012).*

*Primary Examiner* — Jun S Yoo
(74) *Attorney, Agent, or Firm* — Kevin Parks

(57) ABSTRACT

A method for producing a bearing component includes providing a bearing component blank with an iron-based metal substrate, hardening the metal substrate, treating the metal substrate by an alkaline treatment bath in a region to form an iron oxide-based blackening layer as a conversion layer with an initial layer thickness (db) on the region, and rolling a spherical body over the region to compress the conversion layer in the region to form a bearing component with a protective layer having a final layer thickness (de) that is less than 95% of the initial layer thickness (db). The spherical body may be a component part of a hydrostatic finish rolling tool or a hydrostatic deep rolling tool. The spherical body may include a hard metal or a ceramic.

16 Claims, 5 Drawing Sheets

(58) Field of Classification Search
CPC .............. F16C 2220/44; F16C 2223/04; F16C 2240/18; F16C 33/14; F16C 33/66; F16C 2223/40; F16C 33/125; B05D 3/102
See application file for complete search history.

(56) References Cited

U.S. PATENT DOCUMENTS

| | | | |
|---|---|---|---|
| 2013/0251298 A1 | 9/2013 | Gegner et al. | |
| 2014/0212082 A1 | 7/2014 | Gegner et al. | |
| 2014/0356639 A1* | 12/2014 | Gegner | F16C 33/34 |
| | | | 428/469 |
| 2015/0036960 A1* | 2/2015 | Gegner | F16C 33/64 |
| | | | 384/569 |

FOREIGN PATENT DOCUMENTS

| | | |
|---|---|---|
| CN | 103732795 A | 4/2014 |
| CN | 104011413 A | 8/2014 |
| CN | 104968474 A | 10/2015 |
| DE | 102007048750 | 4/2009 |
| DE | 102007055575 | 6/2009 |
| DE | 102010031439 A1 | 1/2012 |
| DE | 102012215591 | 3/2014 |
| DE | 102013201321 | 7/2014 |
| DE | 102014220976 | 4/2015 |
| DE | 102015204656 | 9/2016 |
| DE | 102016202108 | 8/2017 |
| GB | 1081414 A | 8/1967 |
| JP | S5337151 A | 4/1978 |
| JP | H0819961 A | 1/1996 |
| JP | 2004270888 A | 9/2004 |
| JP | 2011117489 A | 6/2011 |
| WO | 2016173596 A1 | 11/2016 |
| WO | 2019057242 | 3/2019 |

* cited by examiner

METHOD FOR PRODUCING A BEARING COMPONENT, AND BEARING COMPONENT

CROSS-REFERENCE TO RELATED APPLICATIONS

This application is the United States National Phase of PCT Appln. No. PCT/DE2018/100781 filed Sep. 13, 2018, which claims priority to German Application No. DE102017121629.4 filed Sep. 19, 2017, the entire disclosures of which are incorporated by reference herein.

TECHNICAL FIELD

The disclosure relates to a method for producing a bearing component. The disclosure furthermore relates to a bearing component.

BACKGROUND

Bearing components and rolling bearings are used in a large number of everyday objects and for industrial purposes, e.g. in wind power generators or wheel bearings. Bearing components of this kind have a service life, wherein such a service life is taken to mean the number of revolutions or hours of operation until failure occurs. The failure of the bearing component is often based on damage to the material and/or fatigue of the material. A frequent phenomenon associated with such damage to the material is white-etching cracks (WEC). In the prior art, the response to such premature fatigue phenomena is to apply passivation layers, e.g. by means of blackening. However, even with bearing components that have such a passivation layer, material fatigue phenomena may occur, especially in the initial period.

DE 10 2007 055 575 A1 describes a raceway element of a rolling bearing assembly, wherein the raceway element has at least one rolling track, wherein rolling elements made of steel are provided on the rolling track. In this case, the raceway element is designed in such a way that it has compressive internal stresses at a level of at least 400 megapascals below the surface of the rolling track over the entire depth range from 0 to about 40 micrometers.

SUMMARY

A method according to the disclosure for producing a bearing component includes a bearing component blank with an iron-based metal substrate and a conversion layer. The conversion layer is applied to the metal substrate, at least in some region or regions, and has an initial layer thickness. An iron oxide-based blackening layer is formed as the conversion layer and is produced by treatment of the metal substrate by means of an alkaline treatment bath, at least in some region or regions. In order to obtain the bearing component, the metal substrate of the bearing component blank is hardened and a spherical body is rolled over the bearing component blank at least in a region of the conversion layer. The conversion layer is compressed in this region and a protective layer of the bearing component with a final layer thickness is formed. The final layer thickness is less than 95% of the initial layer thickness.

In particular, the bearing component is a component of a rolling bearing or of a sliding bearing, in particular a bearing ring, a raceway element or a rolling element.

In particular, the bearing component is based on a bearing component blank. The bearing component blank has an iron-based metal substrate and a conversion layer. A conversion layer is formed by chemical conversion of the material of the metal substrate at the surface thereof, in particular being formed by oxidation of the metal substrate at the surface thereof. In particular, the iron-based metal substrate is formed from steel or stainless steel, preferably from bearing steel. The bearing component blank is preferably a turned bearing component blank, a ground bearing component blank and/or a honed bearing component blank.

The bearing component blank has a conversion layer, wherein the conversion layer preferably completely covers the surface of the bearing component blank. As an alternative, the conversion layer is present partially or in a section or sections on the surface of the bearing component blank. The conversion layer is a black surface oxidation layer in the form of a blackening layer.

In addition, the conversion layer can include an organic material, e.g. a plastic, introduced by aftertreatment of the conversion layer. The conversion layer has an initial layer thickness. The initial layer thickness is preferably the same throughout the bearing component blank. The initial layer thickness is preferably greater than 0.5 micrometers, in particular greater than 1 micrometer. In particular, the conversion layer is plastically deformable and is preferably rendered dimensionally stable by roller burnishing after plastic deformation.

The bearing component is obtained from the bearing component blank by overrolling the bearing component blank, wherein the conversion layer is overrolled at least in some region or regions. During the overrolling process, the conversion layer is subjected to a force and/or a pressure. In particular, the pressure during overrolling is greater than 2000 megapascals, preferably greater than 5000 megapascals, and, more specifically, greater than 7000 megapascals.

After the overrolling process, the conversion layer forms a protective layer on the bearing component. The protective layer is thus formed by the conversion layer compacted and smoothed by the overrolling process. The protective layer on the bearing component has a final layer thickness. In particular, the final layer thickness of the protective layer is the same in all the regions of the bearing component. In particular, the final layer thickness is less than 1.8 micrometers, preferably less than 1.5 micrometers and, more specifically, less than 1 micrometer. The process of overrolling the conversion layer is carried out in such a way that the conversion layer is compacted in a manner such that the final layer thickness has a thickness which is less than 95% of the initial layer thickness, in particular less than 90% and, more specifically, less than 80% of the initial layer thickness.

The disclosure provides a method for producing a bearing component which has a uniformly compacted and continuous protective layer. The process of overrolling the conversion layer represents a gentle run-in process and/or a process of running in using tools with specifiable parameters for the bearing component, for example. In the prior art, however, the process of running in is nonuniform when coated bearing components are run in actual use, wherein the conversion layer is not compacted uniformly everywhere and therefore the protective layer is not formed uniformly everywhere. Moreover, it may happen that the conversion layer of a bearing component blank catches and/or snags during installation, with the result that the conversion layer is partially destroyed, and fatigue occurs more quickly in the destroyed and/or damaged sections. In contrast, the selective overrolling of the conversion layer in accordance with the invention ensures that a continuous, particularly uniform protective layer is formed and hence that the long-term stability of the bearing component is increased.

The conversion layer is an iron-based blackening layer, preferably comprising iron oxide and, more specifically, comprising a mixed iron oxide. To form the blackening layer here, a previously hardened iron-based metal substrate is superficially oxidized. Provision can furthermore be made for the conversion layer to be aftertreated with an organic material, e.g. to be provided with a plastic coating, consisting, for example, of a finish coat or wax. However, impregnation of the conversion layer by means of a lubricant, in particular an oil, grease or a water-repellent medium, may be employed. It is particularly preferred if the conversion layer is a blackening layer referred to by the name Durotect-B® (mixed iron oxide, predominantly magnetite) produced by Schaeffler.

In this context, the hardening of the metal substrate can be accomplished by means of a conventional hardening method. In particular, case hardening, inductive hardening, carbonitriding, nitriding, carburizing, martensitic hardening or bainitic hardening is carried out. It has been found that the hardening of the metal substrate before the formation of the blackening layer allows particularly uniform compaction of the blackening layer by overrolling.

In particular, it is envisaged that the spherical body for overrolling the blackening layer is a component part of a hydrostatic finish rolling or deep rolling tool. In particular, the hydrostatic rolling tool can be operated in such a way that the pressure during overrolling can be adjusted selectively. Provision can furthermore be made for the spherical body of the hydrostatic rolling tool to roll over the entire surface of the bearing component blank, wherein the hydrostatic rolling tool and/or the bearing component blank are/is moved during this process.

In particular, the spherical body is formed by a hard metal or ceramic ball. More specifically, the hydrostatic rolling tool is formed as a spherical body with a hard metal or ceramic ball. In particular, provision can be made for the rolling tool to have a ball, wherein the ball is exchangeable and/or the ball diameter of the rolling tool can be changed. For example, the rolling tool can be operated with balls of different diameters, wherein the balls are exchangeable in the rolling tool and the ball diameter can be changed during the exchange. The balls have a diameter of greater than 2 millimeters or greater than 6 millimeters or greater than 13 millimeters, for example.

As a particular preference, the conversion layer is compacted in such a way by being overrolled that the protective layer has a hardness which corresponds to at least 120% of a hardness of the conversion layer. Provision is furthermore made for the hardness of the protective layer to correspond to at least 150% of the hardness of the conversion layer and, more specifically, for the hardness of the protective layer to correspond to at least 200% of the hardness of the conversion layer. Increasing the hardness of the protective layer increases the rolling load capacity of the bearing component, in particular.

Moreover, overrolling not only makes it possible to compact the conversion layer but furthermore makes it possible to reduce the roughness of the surface of the conversion layer. In particular, the surface is smoothed during the overrolling of the conversion layer, with the result that the protective layer has a lower roughness than the conversion layer.

As a particular preference, the conversion layer is compacted in such a way by being overrolled that the bearing component has compressive internal stresses of more than 150 megapascals, preferably of more than 250 megapascals and, more specifically, of more than 500 megapascals, below the surface, at least in the region of the protective layer. Provision is preferably made for overrolling to result in the conversion layer and/or the bearing component blank having compressive internal stresses of greater than 800 megapascals and, more specifically, greater than 1000 megapascals. The internal stress of the bearing component and/or of the protective layer can be adjusted, in particular, by means of the ball size of the rolling tool. The internal stress can furthermore be adjusted by means of a cooling fluid pressure during overrolling. In particular, the cooling fluid pressure during overrolling is greater than 10 bar, more specifically greater than 200 bar. Provision is furthermore made for the cooling fluid pressure to be less than 450 bar.

As an option, provision is made for the bearing component blank to be overrolled without slip in the overrolling process. This embodiment is based on the consideration that slip occurs during the conventional prior-art run-in process of a bearing component blank with a conversion layer in the actual use thereof, wherein the slip leads to nonuniform formation of the protective layer. It is thus possible, by means of the controlled, slip-free run-in process during the selective overrolling of the bearing component blank, to ensure that the protective layer is formed uniformly and the failure rate is low.

One embodiment of the invention envisages that overrolling is preceded by a passivation step to produce the conversion layer on the bearing component blank. In this passivation step, a conversion layer is produced, wherein the iron material of the metal substrate is converted superficially to an iron oxide (mixed oxide). In particular, the metal surface of the metal substrate is converted in the passivation step into an amorphous oxide layer. As a particular preference, a mixed iron oxide layer is produced on the substrate as an amorphous oxide layer in the passivation step. For this purpose, the bearing component blank is treated with a hot alkaline solution, wherein the metal of the metal substrate is converted superficially during this treatment to an oxide that forms the conversion layer. The conversion layer produced by means of the passivation step preferably has a thickness greater than or equal to 0.5 micrometers and furthermore a thickness of less than 3 micrometers.

Furthermore, provision is made, in particular, for overrolling to be preceded by a bearing component blank production step, wherein in the bearing component blank production step, the bearing component blank is produced with a blank geometry, wherein, after being overrolled, the bearing component has a final geometry. The blank geometry is preferably different from the final geometry. In particular, the blank geometry is chosen so that the bearing component has the desired final geometry after the rolling of the bearing component blank.

The disclosure furthermore relates to a bearing component produced by the disclosed method. The bearing component is a rolling bearing component, for example, and, in particular, a rolling bearing component having a raceway. In particular, the bearing component is designed as a bearing ring or as a rolling element. As an option, the bearing ring and/or the rolling bearing component and/or the rolling element are/is designed for a large rolling bearing and/or have/has a pitch circle diameter greater than 500 mm.

The conversion layer is preferably applied exclusively or at least to the raceway of the bearing ring. In particular, the entire surface of the rolling element and/or of the bearing ring has the conversion layer, wherein only a subsection, in particular the raceway of the bearing ring and/or the rolling surface of the rolling element, has been overrolled and has the protective layer. As a particular preference, the rolling bearing component and/or the bearing ring and/or the rolling element are/is designed as a component for a wind turbine, in particular for a rotor bearing assembly, and/or form/forms a component part of a taper roller bearing. The bearing component has a protective layer on a hardened metal substrate, wherein the protective layer is produced by the overrolling of the conversion layer.

BRIEF DESCRIPTION OF THE DRAWINGS

Further features, advantages and effects of the disclosure will become apparent from the following description of preferred illustrative embodiments. In the drawings.

DETAILED DESCRIPTION

Figure 1:
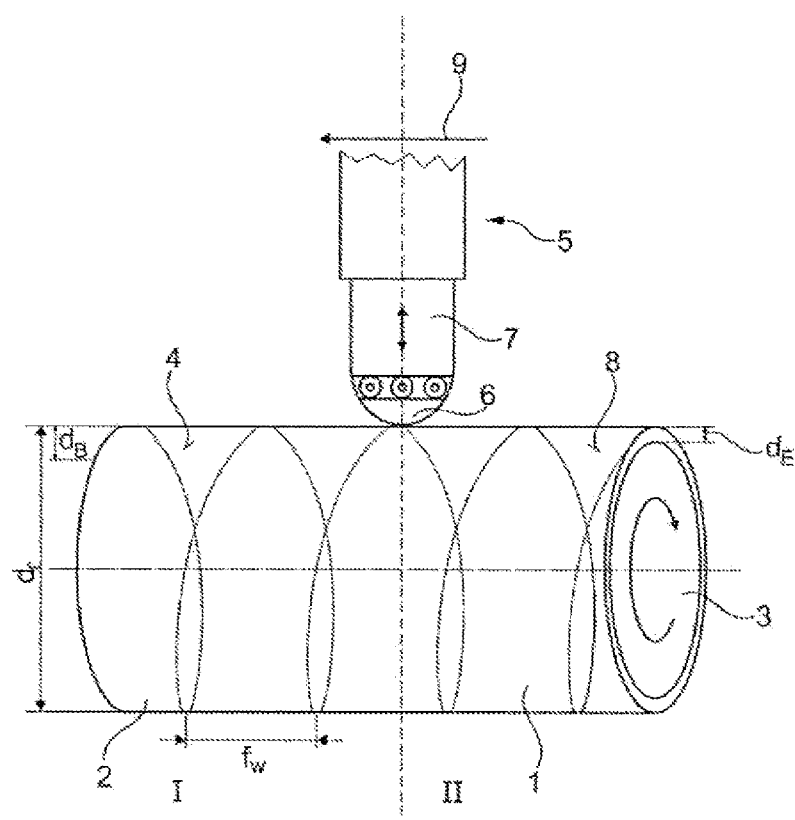
FIG. 1 shows a schematic view of the machining of a bearing component blank to produce the bearing component.

FIG. 1 shows schematically a bearing component 1 and a bearing component blank 2 as the method for producing the bearing component 1 is carried out. FIG. 1 is divided into two sections I and II, wherein section I shows the bearing component blank 2, and section II shows the bearing component 1. In particular, bearing component 1 is the product of the machining of the bearing component blank 2 in accordance with the method.

The bearing component blank 2 comprises a substrate 3, wherein the substrate 3 is a hardened metal substrate 3, e.g. a steel. In particular, it is also possible for the metal substrate 3 to be some other iron-based metal alloy. Here, the hardened metal substrate 3 forms a cylindrical shape. A conversion layer 4 in the form of a blackening layer is formed on the surface of the substrate 3, in particular on the lateral cylinder surface of the metal substrate 3. Based on the substrate 3 made of steel, the conversion layer 4 is here formed from a mixed iron oxide. The conversion layer 4 has a thickness, wherein this thickness forms the initial layer thickness $d_b$. The initial layer thickness $d_b$ is greater than 1.5 micrometers and, more specifically, greater than 0.5 micrometer. The metal substrate 3 and the conversion layer 4 together form the cylindrical bearing component blank 2, which has a diameter dr.

The bearing component blank 2 is overrolled by means of a rolling tool 5. The rolling tool 5 has a ball 6, which is in direct contact with the conversion layer 4 and thus with the bearing component blank 2. The rolling tool 5 is designed as a hydrostatic rolling tool 5 and has a hydrostatic telescopic compensator 7. The rolling tool 5 subjects the bearing component blank 2 to a force F, wherein the conversion layer 4 is compacted to give the protective layer 8 by being subjected to the force F in this way.

To overroll the bearing component blank 2, the bearing component blank 2 is set in rotation, wherein the rotation takes place with a speed. In particular, the speed is adjustable. During the rotation of the bearing component blank 2, the rolling tool 5 is moved in a feed direction 9. By virtue of the movement of the rolling tool 5 in the feed direction 9 during the rotation of the bearing component blank 2, a surface of the bearing component blank 2 is traversed by means of the ball 6. As an adjustable measure in the method for producing the bearing component 1, the feed $f_w$, in particular, must be specified, wherein the feed $f_w$ can be adjusted by the combination of the speed and the feed direction 9 or feed rate.

The overrolling of the bearing component blank 2 compacts, smoothes and hardens the conversion layer 4. The overrolled conversion layer 4 forms the protective layer 8. The protective layer 8 has a thickness, wherein this thickness forms the final layer thickness $d_e$. The final layer thickness $d_e$ is less than 80% of the initial layer thickness $d_b$. While the conversion layer 4 of the bearing component blank 2 is deformable and sensitive to shocks, the protective layer 8 is non-deformable and insensitive to shocks. The protective layer 8 is thus formed by the compacted conversion layer 4.

Figure 2:
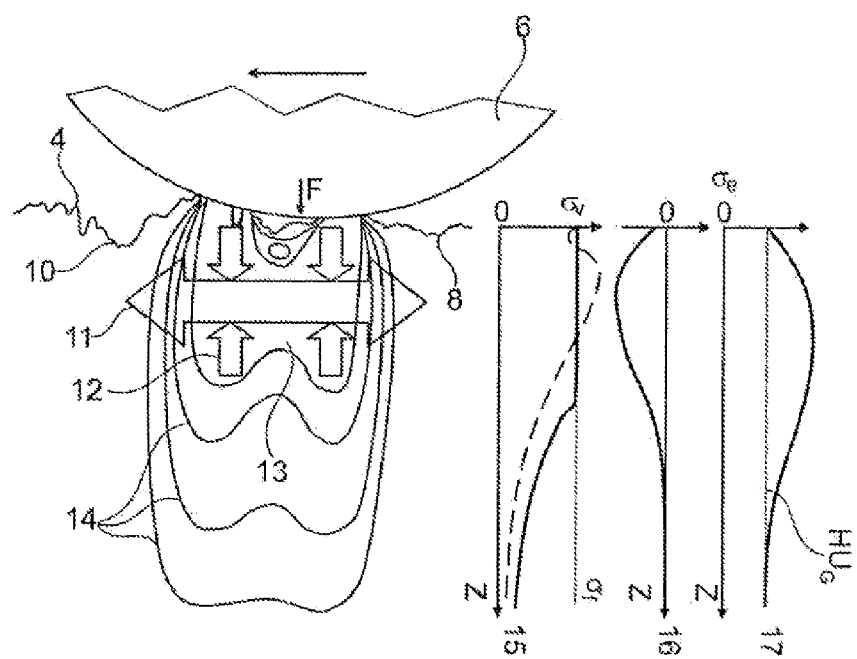
FIG. 2 shows a schematic detail view of the overrolling of the bearing component blank.
Figure 3:
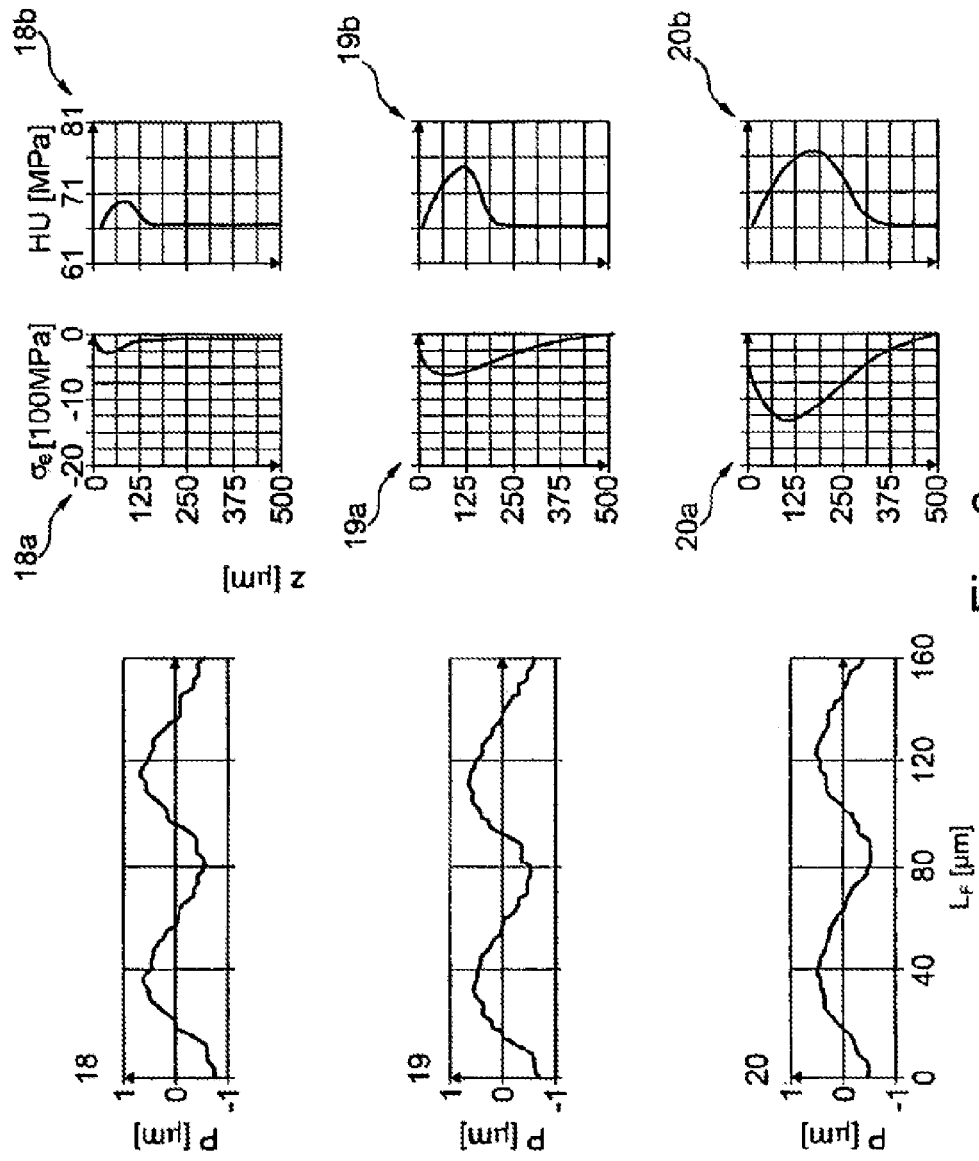
FIG. 3 shows boundary zone influencing by the overrolling of the bearing component blank.
Figure 4:
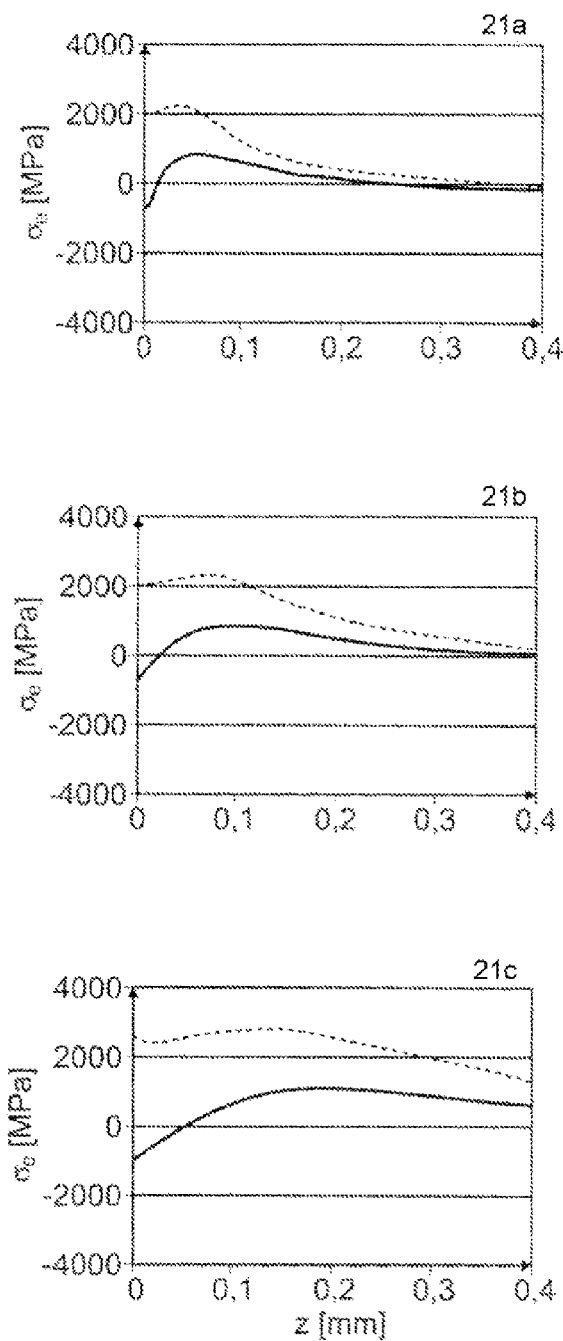
FIG. 4 shows internal stresses in the bearing component after overrolling.

To produce the protective layer 8 from the conversion layer 4, the bearing component blank 2 is overrolled, wherein overrolling takes place with suitable parameters that are required to achieve the desired material properties during overrolling. In FIGS. 2 to 4, achievable properties of the bearing component 1 are illustrated with the corresponding parameters.

FIG. 2 shows a detail of the conversion layer 4, of the protective layer 8 and of the ball 6. The conversion layer 4 has a rough surface, wherein this rough surface has deep notches and pits 10. After overrolling, the protective layer 8 formed has a relatively smooth surface with a lower roughness. The ball 6 subjects the surface of the bearing component blank 2 to a force F in the region of the conversion layer 4. In particular, the force F is greater than 5000 megapascals.

During overrolling in the corresponding region, there are number of prevailing stresses within the bearing component blank 2 and/or the bearing component 1. One stress that may be mentioned is the tensile stress 11, which is oriented substantially in alignment with the surface, i.e. with the conversion layer 4 or protective layer 8. The compressive stress 12 is opposed to the force F. Areas of plastic deformation 13 are furthermore entered in this figure, and lines of equal equivalent stress 14 are indicated, wherein these have a similar contour.

Three diagrams are depicted in the right-hand part of FIG. 2, wherein diagram 15 shows the equivalent stress $\sigma_v$ versus the distance Z from the surface, diagram 16 shows the internal stress $\sigma_e$ versus the distance Z from the surface and diagram 17 shows the hardness HU versus the distance Z from the surface.

It can be seen in diagram 15 that the equivalent stress $\sigma_v$ in relation to the distance Z from the surface assumes a relatively complex profile. Here, the equivalent stress $\sigma_v$ should be considered relative to a flow stress $\sigma_f$. In the region of the surface, the equivalent stress $\sigma_v$ is somewhat lower than the flow stress $\sigma_f$. With increasing distance Z from the surface, the equivalent stress $\sigma_v$ is greater than the flow stress $\sigma_f$, wherein, as the distance Z from the surface increases further, the equivalent stress $\sigma_v$ falls below the flow stress $\sigma_f$ again and approaches a minimum value. The region of the distance from the surface at which the equivalent stress $\sigma_v$ is greater than the flow stress $\sigma_f$ represents an ideally elastic region, wherein the region in which the equivalent stress $\sigma_v$ is less than the flow stress $\sigma_f$ represents a really plastic region.

Diagram 16 indicates the internal stress $\sigma_e$ relative to the distance Z from the surface. Here, it is apparent that the internal stress $\sigma_e$ from the surface into the interior of the bearing component 1 is always negative and, from a starting value, falls further and assumes a minimum, wherein the internal stress $\sigma_e$ approaches 0 from this minimum. The point of maximum internal stress $\sigma_e$ is therefore at a certain distance from the surface.

Diagram 17 shows the hardness HU versus the distance Z from the surface. In addition, a basic hardness $HU_G$ is indicated as a comparison value. At the surface of the bearing component 1, the hardness is identical with the basic hardness $HU_G$, wherein, from there, the hardness HU increases with increasing distance from the surface and tends toward a maximum, wherein, from this maximum onward, the hardness HU tends back toward the basic hardness $HU_G$.

FIG. 3 shows several diagrams 18, 19, 20 for the surface roughness P of the protective layer 8 obtained by rolling the conversion layer 4 with different forces F. Diagram 18 shows the surface roughness P along a feed path $L_F$. Overrolling at ten megapascals results in a mean peak to valley height of 1.40 micrometers.

Diagram 19 illustrates the surface roughness P along the feed path $L_F$ for a bearing component overrolled with a force F of twenty megapascals. This results in a mean peak to valley height of 1.28 micrometers. Diagram 20 illustrates the surface roughness P for a bearing component 1 overrolled at 40 megapascals, illustrated along the feed path $L_F$. A mean peak to valley height of 0.98 micrometers is obtained for the protective layer 8. Here, it is apparent that the surface roughness P, more specifically the mean peak to valley height, decreases as the force F increases.

Diagram 18*a* shows the profile of the internal stress versus the distance Z from the surface for the force F of ten megapascals, while diagram 18*b* shows the hardness HU for overrolling with the force F of ten megapascals. Diagram 19*a* shows the internal stress for a force F of twenty megapascals, and diagram 20*a* shows the internal stress for a force F of 40 megapascals. Here, it is apparent that, as the force F increases, the internal stress also increases, wherein, as the force F increases, the maximum of the internal stress also shifts into the interior of the bearing component 1 and/or of the protective layer 8.

Diagram 19*b* shows the hardness HU for the force F of 20 megapascals, while diagram 20*b* shows the hardness HU for the force F of 40 megapascals. Here, it is apparent that, as the force F increases, the hardness HU increases, and, as the force F increases, the maximum of the hardness HU shifts into the interior of the bearing component 1 and/or of the protective layer 8.

FIG. 4 shows the internal stresses $\sigma_e$ versus the distance Z from the surface for different diameters of the ball 6. Diagram 21*a* illustrates the internal stress for a force F of ten megapascals at a diameter of the ball 6 of three millimeters. Diagram 21*b* illustrates the internal stress $\sigma_e$ for a force F of 10 megapascals at a diameter of the ball 6 of six millimeters, and FIG. 21*c* illustrates the internal stress $\sigma_e$ for a force F of 10 megapascals at a diameter of the ball 6 of 13 millimeters. Here, it is apparent that with the same force F of 10 megapascals and an increase in the diameter of the ball 6, there is a shallower gradient of the internal stress $\sigma_e$ in the case of small distances Z from the surface, and the decline from the maximum of the internal stress $\sigma_e$ is shallower in the case of larger diameters.

Figure 5:
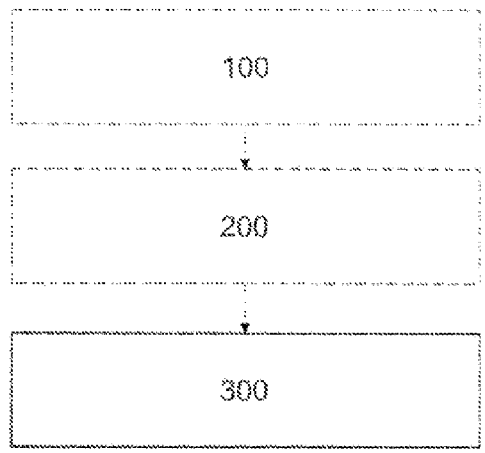
FIG. 5 shows a flow diagram of the method.

FIG. 5 shows schematically a sequence of the proposed method as an illustrative embodiment. In a production step 100, a metal substrate 3 is produced from an iron-based metallic material. Here, the production step 100 can comprise turning, honing, milling, calking and/or forming the material to give the metal substrate 3. The metal substrate 3 is then hardened. In a passivation step 200, the hardened metal substrate 3 is provided with a conversion layer 4. For this purpose, the metal substrate 3 is treated in an alkaline solution, wherein the surface of the metal substrate 3 is converted into a metal oxide, which forms the conversion layer 4. Here, the metal substrate 3 with the conversion layer 4 forms the bearing component blank 2. In an overrolling step 300, the bearing component blank 2 is overrolled, at least in a region of the conversion layer 4. In particular, only sections of the bearing component blank 2 are overrolled, e.g. only the running surface of a rolling bearing ring or the rolling surfaces of a rolling element. In the overrolling step 300, the conversion layer 4 is compacted to give the protective layer 8, wherein the bearing component blank 2 is transformed into the bearing component 1 by the overrolling step 300.

Figure 6:
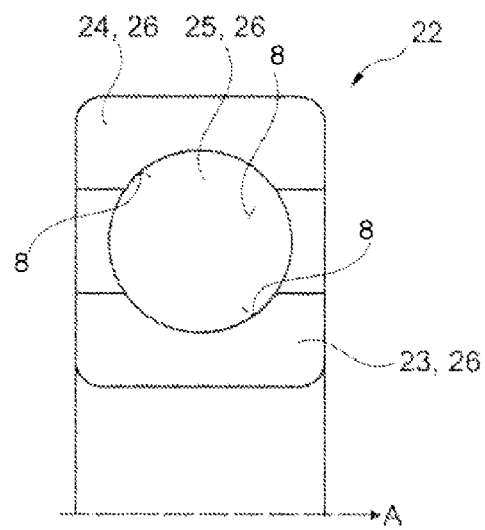
FIG. 6 shows a schematic section through a rolling bearing.

FIG. 6 shows schematically a section through a rolling bearing 22. The rolling bearing 22 comprises an inner ring 23 and an outer ring 24. The inner ring 23 and the outer ring 24 are arranged concentrically with respect to one another and can be rotated relative to one another so as to be rotatable about a common axis A. A plurality of rolling elements 25 is arranged between the inner ring 23 and the outer ring 24. The inner ring 23, the outer ring 24 and the rolling elements 25 each form a bearing component 26. The bearing components 26 each have the protective layer 8 on their surface. The inner ring 23 and the outer ring 24 each have the protective layer 8 on the raceway, wherein the raceway has and/or forms a rolling surface for the rolling elements 25. The rolling elements 25 have the protective layer 8 on the entire rolling surface, wherein the entire surface of the rolling elements 25 is covered by the protective layer 8 for the rolling elements 25, which are spherical in this case.

REFERENCE NUMERALS

1, 26 bearing component
2 bearing component blank
3 metal substrate
4 conversion layer
5 rolling tool
6 spherical body or ball
7 telescopic compensator
8 protective layer
9 feed direction
10 pits
11 tensile stress
12 compressive stress
13 deformation
14 equivalent stress
15 diagram
16 diagram
17 diagram
18*a,b* diagram
19*a,b* diagram
20*a,b* diagram
21*a,b,c* diagram
22 rolling bearing
23 inner ring
24 outer ring
25 rolling element
I first section
II second section
$d_b$ initial layer thickness
$d_f$ diameter F force
$f_{iv}$ feed
$d_e$ final layer thickness
$\sigma_v$ equivalent stress
Z distance from the surface
$\sigma_e$ internal stress
HU hardness
σv equivalent stress
$\sigma_f$ flow stress
$HU_G$ basic hardness
$L_F$ feed path
A axis
P surface roughness

The invention claimed is:

1. A method for producing a bearing component comprising:
   providing a bearing component blank with an iron-based metal substrate;
   hardening the metal substrate;
   treating the metal substrate by an alkaline treatment bath in a region to form an iron oxide-based blackening layer as a conversion layer with an initial layer thickness (db) on the region; and
   rolling a spherical body over the region to compress the conversion layer in the region to form a bearing component with a protective layer having a final layer thickness (de) that is less than 95% of the initial layer thickness (db).

2. The method of claim 1, wherein the spherical body is a component part of a hydrostatic finish rolling tool or a hydrostatic deep rolling tool.

3. The method of claim 1 wherein the spherical body comprises a hard metal or a ceramic.

4. The method of claim 1 wherein the protective layer has a protective layer hardness that is at least 150 percent of a conversion layer hardness of the conversion layer.

5. The method of claim 1, wherein the bearing component has an internal stress (σe) greater than 500 megapascals in the region of the protective layer.

6. The method of claim 1, wherein the spherical body is rolled over the region without slip.

7. The method of claim 1, wherein the bearing component blank comprises a blank geometry and the bearing component comprises a final geometry.

8. The method of claim 1, wherein the step of rolling a spherical body over the region to compress the conversion layer comprises applying a pressure greater than 2000 megapascals to the conversion layer with the spherical body.

9. The method of claim 1, wherein a diameter of the spherical body is greater than 3 mm.

10. The method of claim 1, wherein a diameter of the spherical body is greater than 13 mm.

11. The method of claim 1, wherein the final layer thickness is less than 1.8 micrometers.

12. The method of claim 1, wherein the final layer thickness is less than 1.0 micrometers.

13. The method of claim 1, wherein a surface roughness of the region has a mean peak to valley height that is less than or equal to 1.40 micrometers.

14. The method of claim 13, wherein the surface roughness of the region has a mean peak to valley height that is less than or equal to 1.0 micrometers.

15. The method of claim 8, wherein the pressure is greater than 5000 megapascals.

16. The method of claim 8, wherein the pressure is greater than 7000 megapascals.

* * * * *